United States Patent [19]

Skora

[11] Patent Number: 5,001,175

[45] Date of Patent: Mar. 19, 1991

[54] EPOXY-SULFONAMIDE COMPOUNDS AND COMPOSITIONS

[75] Inventor: Stanislaw B. Skora, Mountain Lakes, N.J.

[73] Assignee: Estron Chemical, Inc., Calvert City, Ky.

[21] Appl. No.: 392,474

[22] Filed: Apr. 11, 1989

[51] Int. Cl.$^5$ ............................................. C08G 59/44
[52] U.S. Cl. ..................................... 523/448; 525/113; 525/438; 528/109; 528/361; 528/391; 528/103
[58] Field of Search ............... 528/103, 109, 361, 391; 525/113, 438; 523/448

[56] References Cited

U.S. PATENT DOCUMENTS

| | | | |
|---|---|---|---|
| 2,712,001 | 6/1955 | Greenlee | 528/109 X |
| 3,819,581 | 6/1974 | Smith | 528/109 |
| 3,849,375 | 11/1974 | Smith | 528/109 |
| 4,528,359 | 7/1985 | Berman et al. | 528/109 |
| 4,618,526 | 10/1986 | Berman et al. | 528/109 X |

*Primary Examiner*—Earl Nielsen
*Attorney, Agent, or Firm*—Mathews, Woodbridge & Collins

[57] ABSTRACT

The present invention is the reaction product of an aryl sulfonamide, at least one epoxy compounds comprising at least one diepoxy compound and optionally at least one monoepoxy compound. The diepoxy compound comprises two epoxy groups and the monoepoxy compound comprises one epoxy group. Preferably, the monoepoxy compound and the diepoxy compound have no hydroxyl groups or other functional groups. Specific embodiments include a reaction product derived from at least one monoepoxy compound and at least one diepoxy compound. The reaction product of the present invention has a relatively low molecular weight of from 450 to 2000, preferably 450 to 1000, and more preferably 450 to 800.

20 Claims, No Drawings

EPOXY-SULFONAMIDE COMPOUNDS AND COMPOSITIONS

BACKGROUND OF THE INVENTION

The present invention is in the field of low molecular weight compounds which are the reaction products of epoxy and sulfonamide compounds and compositions, more particularly the present invention relates to the reaction product of at least one diepoxy compound and optionally at least one monoepoxy compound, and at least one sulfonamide compounds and related compositions useful as lacquers, coatings, and polymer concentrates.

U.S. Pat. No. 2,510,886 discloses the reaction product of sulfonamide, phenol and epoxy compounds useful in the manufacture of varnishes and coating compositions, molding compositions, adhesives, and films. The compounds are relatively high molecular weight, being made from polyhydric phenols and polyepoxides. The final reaction products are infusible.

U.S. Pat. No. 2,712,001 discloses compounds of sulfonamide and epoxide used in compositions which are useful to make molding compositions and articles, adhesives, films and fibers. The epoxides are characterized as complex epoxides made from polyhydric phenols an polyfunctional chlorohydrins containing both terminal epoxy groups and terminal primary hydroxyl groups. The complex epoxides reacted with the sulfonamides will have varying properties depending on the proportion of the reactants and degree of polymerization. The complex epoxides include the reaction product of bisphenol and epichlorohydrin. The reaction products, unless too highly polymerized are soluble in solvents such as acetone, methyl ethyl ketone, and diacetone alcohol and can be used to make clear or pigmented varnishes. The reaction products can further react to form an infusible state and an insoluble product. These compounds include a relatively high concentration of hydroxyl groups which is necessary to attain these results.

Sulfonamide based resins such as resins based on furfural and sulfonamide, and formaldehyde and sulfonamide are known from patents such as U.S. Pat. Nos. 1,840,596, 1,908,159 and 2,609,356. Pigmented sulfonamide formaldehyde-type resins are disclosed in U.S. Pat. No. 2,938,873.

Lacquers are coatings used to protect objects from corrosion, damage and for decorative purposes. A typical air dried lacquer consists of a polymeric binder, resinous modifiers, stabilizers, plasticizers, solvents, and optionally pigments and dyes. In air-dried lacquers the polymeric binders and the resinous modifiers are usually thermoplastic. The resinous modifiers are usually low molecular weight natural or synthetic resins having the ability to improve hardness, adhesion, water resistance, and overall coating durability. Known resin modifiers for lacquers include acrylic oligomers, rosin esters, hydrocarbon resins, ketone formaldehyde resins and toluene sulfonamide formaldehyde resins. Toluene sulfonamide formaldehyde resins are especially useful in lacquers based on organic cellulose derivatives and vinyl polymers.

Toluene sulfonamide formaldehyde resins are light in color and have excellent compatibility with a variety of polymers. They release solvent fast and promote adhesion to a variety of surfaces. Their properties can be varied by changing the ratio of formaldehyde to sulfonamide. The melting point of these resins is usually between 60° C. and 80° C. The main disadvantage of toluene sulfonamide formaldehyde resin is their tendency to release free formaldehyde which is a toxic substance.

SUMMARY OF THE INVENTION

The present invention is the reaction product of an aryl sulfonamide, at least one epoxy compound comprising at least one diepoxy compound and optionally at least one monoepoxy compound. The diepoxy compound comprises two epoxy groups and the monoepoxy compound comprises one epoxy group. Preferably, the monoepoxy compound and the diepoxy compound have no hydroxyl groups or other functional groups other than the epoxy groups.

Specific embodiments include a reaction product derived from at least one monoepoxy compound and at least one diepoxy compound. Alteratively, the reaction product is derived from at least two diepoxy compounds. The reaction product of the present invention has a relatively low molecular weight of from 450 to 2000, preferably 450 to 1600, more preferably 450 to 1000, and most preferably 450 to 800.

The aryl sulfonamide has the formula

where R is an aromatic hydrocarbon radical, and
$R^1$ is H and $R^2$ is the same or different and is selected from H and a hydrocarbon radical of 1 to 25 carbon atoms.

Preferably at least one of $R^1$ and $R^2$ are H, and more preferably both $R^1$ and $R^2$ are H.

Most preferably the aryl sulfonamide is ortho or para toluene sulfonamide or mixtures thereof having the formula

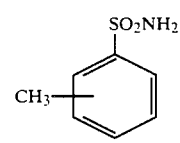

The monoepoxy compound has the formula

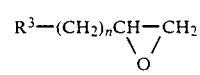

where $R^3$ is selected from H, alkyl groups, and —O—$R^4$ n is 0 or 1, preferably 1, and $R^4$ is an aryl, alkylated aryl, or alkyl hydrocarbon group, preferably having from 4 to 18 carbon atoms. Preferred monoepoxy compounds have the formula

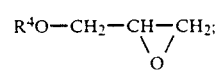

where $R^4$ is butyl, phenyl or methylphenyl groups.

The diepoxy compound has the formula

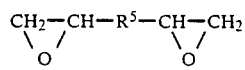

where $R^5$ is selected from

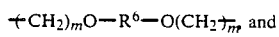

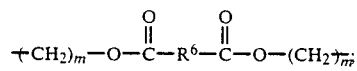

m is 1, and preferably 1, and $R_6$ is an alkyl, cycloalkyl or aryl group which includes two aryl groups connected by alkyl groups.

Preferred diepoxy compounds include

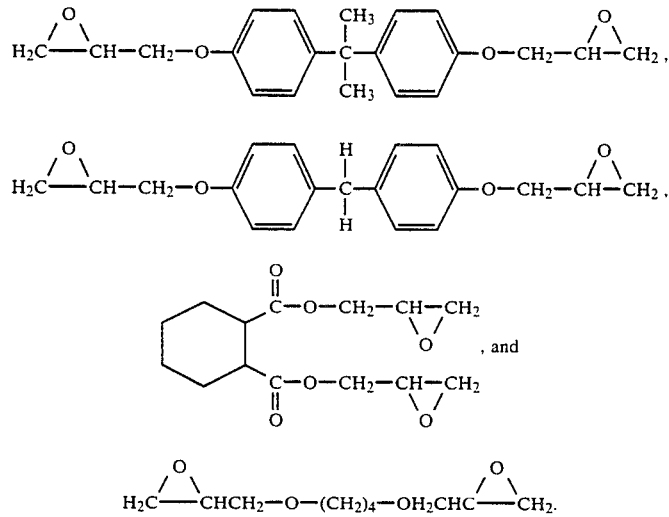

The reaction product of a sulfonamide and mixture having monoepoxy and diepoxy compounds has been found to have excellent solubility and solution stability in most polar and nonpolar solvents. By solution stability in solvents it means that the reaction product resists coming out of solution i.e. precipitating. The reaction product of a sulfonamide and one diepoxy compound or a mixture having at least two diepoxy compounds, and no monoepoxy compound has satisfactory stability but does not as good solution stability as when a monoepoxy compound is present. The reaction product is soluble in a variety of solvents including esters, ketones, alcohols and aromatic hydrocarbons.

The use of a mixture of at least two epoxy compounds has been found to enable an accurate control of the softening point (ASTM E 28-67) of the reaction product. The product is chemically stable if processed below or above its softening point. There are substantially no undesirable volatiles and by-products.

The molar ratio of aryl sulfonamide amide groups to total amount of epoxy groups in the epoxy compound, diepoxy compound and monoepoxy compound, is preferably from about 1:0.8 to 1:1.5, and more preferably 1:1 to 1:1.3. There is a tendancy for the reaction product to gel (crosslink) when the molar ratio is less than about 1:1.5. The ratio of monoepoxy compound and diepoxy compound can be varied to control properties such as softening point, compatability with other polymers and solubility in solvents.

The reaction product is thermoplastic in character with substantially no cross-linking. Preferably the melting point of the reaction product is from 60° C. to 85° C. and more preferably from 65° C. to 75° C. The preferred molecular weight of the reaction product is from about 450 to about 2000, more preferably from about 450 to 1200, and most preferably 450 to 800.

The present invention includes compositions which comprise the above reaction product. The reaction product can be used in compositions for lacquers, coatings, and adhesives. The reaction product has been found particularly useful in lacquers where it results in a hard, light stable durable films.

The reaction product is stable. By stable it means that it remains substantially amorphous and its molecular weight remains substantially constant at ambient conditions and upon heating above its softening point. Preferably, the reaction product does not crystallize at all. This is indicated by and results in the transparency of films and coatings in solvents and in solid form. Where toluene sulfonamide is used the reaction product is stable regardless of which isomer, i.e. ortho, para or their mixture, is used.

DESCRIPTION OF THE PREFERRED EMBODIMENTS

The present invention relates to a reaction product of an aryl sulfonamide, at least one epoxy compound comprising at least one diepoxy compound and optionally at least one monoepoxy compound. Preferably, the epoxy compounds have no hydroxyl groups or other functional groups other than epoxy groups. The present invention includes compositions which comprise the reaction product and which are useful in lacquers, coatings, adhesives and the like.

Useful sulfonamides are aryl sulfonamides having the formula

where R is an aromatic hydrocarbon radical, preferably selected from benzyl, naphthyl and methyl benzyl;

$R^1$ is H and $R^2$ is the same or different and selected from H and hydrocarbon radicals of 1 to 25 carbon atoms. Preferably at least one of $R^1$ and $R^2$ are H, and more preferably $R^1$ is H and $R^2$ is H or an alkyl group of from 1 to 3 carbons, most preferably both $R^1$ and $R^2$ are H.

Preferred aryl sulfonamide include benzene sulfonamide, toluene sulfonamide, and naphthalene sulfonamide. Most preferred are ortho and para toluene sulfonamides and mixtures thereof. The stability of the reaction product has been found to be independent of the isomer of toluene sulfonamide.

Useful and commercially available sulfonamides include p-toluenesulfonamide, $C_7H_9NO_2S$ reported to have a molecular weight of 171.2, a melting point of 136.5° C., a loss on drying of 0.5% max, an ash content of 0.2% max, and a purity of 98% min, and is in the form of white or light yellow crystals. Useful mixtures of ortho and para toluene sulfonamide are reported to have a molecular weight of 171.2, a moisture content of 1.0% max. A mixture having an ortho to para ratio of 4:6 has a melting point of 105° C. and a mixture having a ratio of 2:8 has a melting point of 120° C.

The epoxy compounds include at least one diepoxy compound and optionally at least one monoepoxy compound. The diepoxy compound is a compound comprising two epoxy groups and the monoepoxy compound is a compound comprising one epoxy group. The epoxy compounds preferably have no hydroxyl groups or other functional groups other than epoxy groups. Where there is more than one epoxy compound the molar ratio of the epoxy compounds can be varied to control properties such as the softening point.

The epoxy compound includes at least one diepoxy compound or a mixture of monoepoxy and diepoxy compounds. The molar ratio of the total monoepoxy and diepoxy groups to aryl sulfonamide groups as well as the ratio of the monoepoxy compound to diepoxy compound can be varied to control the properties of the reaction product such as softening point, solubility and compatability with other polymers. The molar ratio of aryl sulfonamide amide groups to total epoxy groups is preferably from from 1:0.8 to 1:1.5, more preferably from 1:1 to 1:1.3, and most preferably 1:1 to 1:1.1. Where the epoxy compound comprises a mixture of monoepoxy compound and diepoxy compound, the molar ratio of monoepoxy compounds to diepoxy compounds is from 1:10 to 1:0.5 and preferably from 1:10 to 1:5.

Useful monoepoxy compounds have the formula

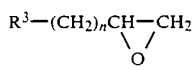

where $R^3$ is selected from H, alkyl groups, and $-O-R^4$, n is 0 or 1, preferably 1, and
$R^4$ is an aryl, alkylated aryl, or an alkyl hydrocarbon group, preferably having from 4 to 18 carbons.
Preferred monoepoxy compounds have the formula

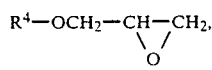

with $R^4$ being phenyl, methylphenyl or butyl groups.

Preferred monoepoxy compounds include phenyl glycidyl ether, cresyl glycidyl ether, and butylglycidyl ether.

Useful diepoxy compounds have the formula

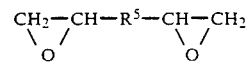

where $R^5$ is selected from

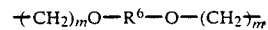

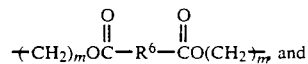

where m is 0 or 1, preferably 1, and
$R^6$ is an alkyl, cycloalkyl, or aryl hydrocarbon including two aryl hydrocarbons connected by an aliphatic hydrocarbon. $R^6$ can be selected from:

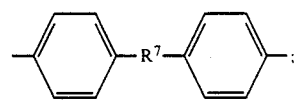

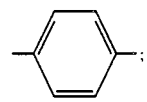

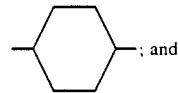

where $R^7$ is selected from

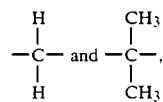

and p is from 2 to 6.

Preferred diepoxy compounds include bisphenol-A dialycidyl ether, bisphenol-F diglycidyl ether, diglycidyl hexahydrophthalate, and butylene diglycidyl ether.

A preferred reaction product is the reaction product of toluene sulfonamide, at least one monoepoxy compound selected from the group consisting of

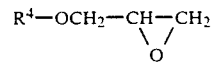

where $R^4$ is an aryl or alkyl hydrocarbon group, and at least one diepoxy compound selected from the group consisting of

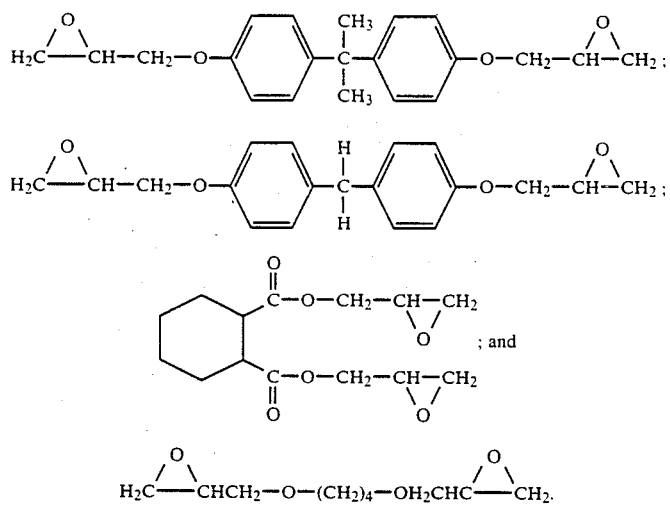

The reaction product preferably has a molecular weight of from 450 to 2,000, preferably from 450 to 1600, more preferably 450 to 1000, and most preferably 450 to 800, and a melting point of from 60° C. to 85° C. and preferably 65° C. to 75° C. The reaction product preferably has a solution viscosity measured using a Gardner Apparatus (ASTM-D-1545) of from Z to Z5.

The reaction product of the present invention can be made by feeding the reactants continuously or batchwise into a suitable reactor at a pressure of from atmospheric to 100 psi, a temperature of from 90° C. to 180° C., under an air or inert gas atmosphere, for from 60 to 600 minutes. The reaction is conducted in the presence of a catalyst such as tertiary ammonium salts including tetramethyl ammonium chloride, trimethyl benzyl ammonium bromide, amines, trimethyl amine, 4-methyl imidazole, dimethylethanol amine, and the like.

Typical compositions comprising the abovedescribed reaction product are useful as lacquer, coatings, adhesive and adhesive compositions.

Such compositions comprise a polymeric binder, the reaction product of the present invention and a solvent. Optionally the composition further comprise stabilizers, plasticizers, flow modifiers and colorants.

The polymeric binder can be any soluble reactive or non-reactive polymer, preferably a thermoplastic polymer or elastomer such as nitrocellulose, cellulose acetate, polyvinyl acetate, polyesters, polyacrylates, polyisoprene, and the like.

The solvents preferably comprise at least two solvents, preferably a mixture of polar and nonpolar solvents such as butyl acetate, ethylacetate, methylethyl ketone, isopropanol, and toluene. Preferred plasticizers include tricresyl phosphate, tricresyl phthalate, and the like.

Preferably, the composition comprises 100 parts by weight (p.b.w.) of polymeric binder. There is from 10 to 80 p.b.w., preferably 10 to 50 and more preferably 10 to 30 p.b.w. of the reaction product of the present invention, and a minimum of sufficient amount of solvent to dissolve the polymeric binder and reaction product up to as much solvent as desired. Useful amounts of solvent in a lacquer composition are from 50 to 800, and preferably 200 to 600 p.b.w.

Lacquers are protective, transparent coatings generally comprising a polymeric binder, resinous modifiers, solvents, and optionally, stabilizers, flow modifiers, plasticizers and colorants. Lacquers comprise a high amount of solvent, i.e. 200 to 600 p.b.w. based on 100 parts of the polymeric binder. A specific lacquer composition of the present invention is a nail polish top coat composition. This composition comprises from a polymeric binder, preferably (nitrocellulose) (100 p.b.w.), from 20 to 75 p.b.w. of the reaction product of the present invention, and from 400 to 800 p.b.w. of solvent. Other optional components include from plasticizers, stabilizers and colorants.

Coating compositions include polymeric binders such as polyurethane (100 p.b.w.) have from 5 to 50 p.b.w. of the reaction product of the present invention and preferably from 50 to 250 p.b.w. solvent. Other optional components include 0.1 to 2.0 p.b.w. of flow control agents, and 0.08 to 1.0 p.b.w. of a catalyst.

Pressure sensitive adhesive compositions include polymer binders such as cellulose acetate (100 p.b.w.), from 50 to 200, and preferably 100 to 175 p.b.w. of the reaction product of the present invention, and preferably from 50 to 200 p.b.w. of solvent. The composition optionally comprises stabilizers, plasticizers, and colorants.

Several examples are set forth below to illustrate the nature of the invention and the manner of carrying it out. However, the invention should not be considered a being limited to the details thereof.

EXAMPLE 1

This example illustrates the basic reaction between a low molecular weight, monomeric diglycidyl ether and toluene sulfonamide in the presence of a catalyst. To a clean, 2-liter, 3-neck flask equipped with mechanical stirrer, condenser, thermometer and inlet for nitrogen, 1 mole (362.0 grams) of commercially pure diglycidyl ether of bisphenol A was charged and heated under a nitrogen blanket to 100 C. While agitating 1.0 gram of 2-methylimidazole and 2 mole (342.4 grams) of commercially pure toluene sulfonamide (ortho and para mixture) was added. The temperature of the reaction mixture was gradually increased to 130° C. and stirred for 24 hours. Periodically samples were taken and analyzed. The results are shown in Table A below.

TABLE A

| Reaction Time Hours | Softening Point °C. | Solution Viscosity |
|---|---|---|
| 1.0 | 42.0 | Z |
| 2.0 | 68.0 | +Z3 |
| 3.0 | 71.5 | Z3–Z4 |
| 4.0 | 75.0 | –Z4 |
| 5.0 | 77.0 | Z4 |
| 6.0 | 79.0 | +Z4 |
| 24.0 | 80.5 | Z4–Z5 |

It will be observed that for all practical reasons the reaction was completed after 6 hours at 130° C. In the foregoing table the softening point was determined by ring-and-Ball Apparatus (ASTM E 28-67) and the solution viscosity by Gardner Apparatus (ASTM D 1545). The viscosity increased from +Z to −Z5. The resin solution was prepared by dissolving the solid resin in butyl acetate to obtain 75.0% solids.

EXAMPLE 2

Example 1 was repeated except that instead of diglycidyl ether of bisphenol A, 1 mole (324.0) grams of diglycidyl ether of bisphenol F was used. The resulting resin was of a light color and had a softening point of 65° C. and the viscosity of a 75% solution in butyl acetate was Z1-Z2.

EXAMPLE 3

Example 1 was repeated, but instead of diglycidyl ether of bisphenol A, 1 mole (286.0 grams) of diglycidyl hexahydrophthalate was used. The resulting resin had a softening point of 75° C. and the viscosity of a 75% solution in butyl acetate was −Z4. The resin had a yellow-brown color.

EXAMPLE 4

A mixture of 181 grams diglycidyl ether of bisphenol A, 162 grams of diglycidyl ether of bisphenol F, 342.4 grams toluenesulfonamide and 1.5 gram dimethylethanol amine was reacted for a period of 6 hours at 130° C. After cooling to room temperature a light colored, brittle resin having a softening point of 69° C. was obtained. The resin was soluble in butyl acetate, methyl ethyl ketone, isopropanol, and toluene.

EXAMPLE 5

A mixture of 289.6 grams of diglycidyl ether of bisphenol A, 60.0 grams phenyl glycidyl ether, 342.4 grams toluenesulfonamide and 1.5 gram dimethylethanol amine was reacted for a period of 6 hours at 130° C. After cooling to room temperature a light colored, brittle resin having a softening point of 61° C. was obtained. The resin has a good solubility in most organic solvents.

The following examples illustrate the use of the new toluenesulfonamide-epoxy resin in coatings and adhesive applications. The formulations were prepared by mixing the ingredients in a high speed mixer until stable, homogenous compositions were obtained. The compositions are in weight percent.

EXAMPLE 6

| Example 6 Nitrocellulose Clear Lacquer For Metals | wt. % |
|---|---|
| Nitrocellulose, 75% in ethanol | 12.9 |
| Thermoplastic acrylic resin | 3.4 |
| Epoxy-toluenesulfonamide resin from Ex. 1 | 4.8 |
| Polyacrylate flow control agent, (Resiflow L, polyacrylate sold by Estron Chemical, Inc.) | 0.1 |
| Tricresyl phosphate plasticizer | 1.3 |
| Isopropanol | 9.7 |
| Butyl acetate | 29.1 |
| Toluene | 38.7 |

EXAMPLE 7

| Example 7 Polyurethane Clear Coating | wt. % |
|---|---|
| Hydroxy-terminated polyester, 75% in butyl acetate (Polymex B-75 sold by Estron Chemical, Inc.) | 56.2 |
| Epoxy-toluenesulfonamide resin from Ex. 4 | 7.8 |
| Polyisocyanate (Desmodur N-75 sold by Mobay Corp.) | 19.5 |
| Polyacrylate flow control agent (Resiflow L) | 0.1 |
| Dibutyl tin dilaurate | 0.1 |
| Toluene | 16.3 |

EXAMPLE 8

| Example 8 Pressure Sensitive Adhesive | wt. % |
|---|---|
| Cellulose acetate | 16.2 |
| Epoxy-toluenesulfonamide resin from Ex. 5 | 25.8 |
| N-ethyl o,p toluenesulfonamide | 33.8 |
| Tricresyl phthalate | 16.1 |
| Thermoplastic acrylic resin (50% in butyl acetate) | 8.1 |

EXAMPLE 9

| Example 9 Nail Polish Clear Top Coat | wt. % |
|---|---|
| Nitrocellulose, 75% in ethanol | 10.0 |
| Epoxy-toluenesulfonamide resin from Ex. 5 | 5.0 |
| Dibutyl phthalate | 4.0 |
| Butyl acetate | 27.5 |
| Isopropyl alcohol | 6.0 |
| Ethyl acetate | 17.5 |
| Toluene | 28.5 |
| Camphor | 1.5 |

While exemplary embodiments of the invention have been described, the true scope of the invention is to be determined from the following claims.

What is claimed is:

1. The reaction product of an aryl sulfonamide compound selected from the group consisting of benzene sulfonamide, toluene sulfonamide and naphthalene sulfonamide and at least one epoxy compound comprising at least one diepoxy compound and optionally at least one monoepoxy compound, the monoepoxy compound and diepoxy compound having no hydroxyl groups, the reaction product having a molecular weight of from 450 to 800.

2. The reaction product of an aryl sulfonamide compound and at least two epoxy compounds comprising at least one monoepoxy compound and at least one diepoxy compound, the monoepoxy compound and diepoxy compound having no hydroxyl groups.

3. The reaction product of claim 1 wherein there are at least two diepoxy compounds.

4. The reaction product of an aryl sulfonamide, a mono-epoxy compound comprising one epoxy group and a diepoxy compound comprising two epoxy groups.

5. The reaction product of claim 4 wherein the aryl sulfonamide has the formula

RSONR¹R² where R is an aromatic hydrocarbon radical, and
R¹ is H and R² is selected from H and a hydrocarbon radical of 1 to 25 carbon atoms.

6. The reaction product of claim 4 wherein
R is a toluene radical,
R¹ is H; and
R² is H or an alkyl group of from 1 to 3 carbons.

7. The reaction product of claim 4 wherein the aryl sulfonamide is selected from ortho and para toluene sulfonamide and mixtures thereof.

8. The reaction product of claim 4 wherein the monoepoxy compound has the formula

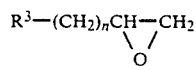

where $R^3$ is selected from H, alkyl groups, and —O—R⁴
n is 0 or 1, and
R⁴ is an aryl, alkylated aryl or alkyl hydrocarbon group.

9. The reaction product of claim 8 wherein the mono-epoxy have the formula

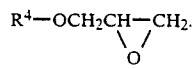

10. The reaction product of claim 4 wherein the diepoxy has the formula

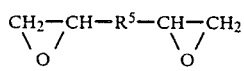

where $R^5$ is selected from

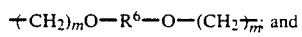

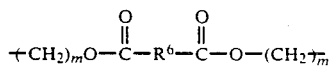

where $R^6$ is an alkyl, cycloalkyl, aryl which includes two aryl groups connected by an alkyl hydrocarbon group, and m is 1.

11. The reaction product of claim 10 where $R^6$ is selected from

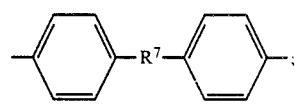

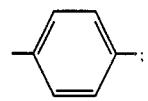

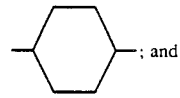

$+CH_2+_p$ where $R^7$ is selected from

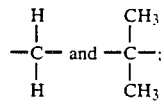

and p is from 2 to 6.

12. The reaction product of toluene sulfonamide, at least one monoepoxy compound having the formula

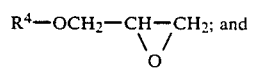

where $R^4$ is an aryl, alkylated aryl or alkyl hydrocarbon group, and
at least one diepoxy compound selected from the group consisting of

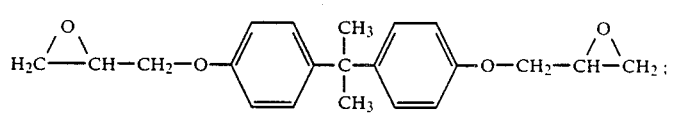

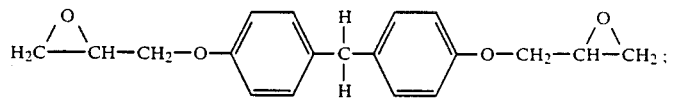

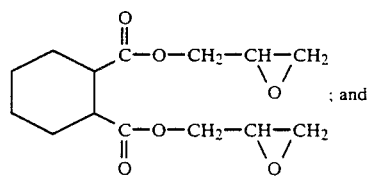
; and

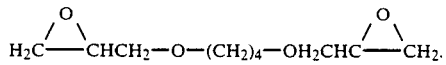

13. The reaction product of claim 12 having a molecular weight of from 450 to 1600.

14. A composition comprising:
   the reaction product of an aryl sulfonamide compound and at least one epoxy compound comprising at least one diepoxy compound and optionally at least one monoepoxy compound, the reaction product having a molecular weight of from 450 to 800;
   a polymeric binder; and
   a vehicle in which the reaction product and polymeric binder are dissolved.

15. The composition of claim 14 wherein there is 100 p.b.w. of the polymeric binder, from 10 to 80 p.b.w. of the reaction product, and from 50 to 800 parts by weight of a solvent.

16. A composition comprising:
   the reaction product of an aryl sulfonamide compound and at least two epoxy compounds comprising at least one monoepoxy compound and at least one diepoxy compound, the monoepoxy compound and diepoxy compound having no hydroxyl groups;
   a polymeric binder; and
   a vehicle in which the reaction product and polymeric binder are dissolved.

17. The composition of claim 14 wherein the reaction product is derived from a mixture of at least two diepoxy compounds.

18. The composition as recited in claim 14 wherein the polymeric binder is selected from the group consisting of nitrocellulose, cellulose acetate, polyesters, and polyacrylates.

19. A composition comprising:
   from 10 to 80 parts by weight of the reaction product of an aryl sulfonamide compound and at least one epoxy compound comprising at least one diepoxy compound and optionally at least one monoepoxy compound, the reaction product having a molecular weight of from 450 to 800; and
   100 parts by weight of a polymeric binder.

20. The composition as recited in claim 19 wherein the polymeric binder is selected from the group consisting of nitrocellulose, cellulose acetate, polyesters, and polyacrylates.

* * * * *